United States Patent [19]

Hollett, Jr. et al.

[11] 4,273,750
[45] Jun. 16, 1981

[54] FLUE GAS DESULFURIZATION APPARATUS AND METHOD

[75] Inventors: Grant T. Hollett, Jr., Elmhurst; Francis S. Flick, Oak Brook, both of Ill.

[73] Assignee: Energy and Pollution Controls, Inc., Bensenville, Ill.

[21] Appl. No.: 32,872

[22] Filed: Apr. 24, 1979

[51] Int. Cl.³ ............................................. B01D 53/08
[52] U.S. Cl. ..................................... 423/244; 55/262; 55/390; 55/459 R; 55/474; 422/176; 422/233; 55/79
[58] Field of Search ........................ 34/8, 10, 57 E, 58; 55/73, 77, 79, 262, 319, 390, 459 R, 474; 422/176, 230–233; 423/244 R, 244 A

[56] References Cited

U.S. PATENT DOCUMENTS

| 1,590,798 | 6/1926 | Barker | 55/474 X |
|---|---|---|---|
| 2,060,166 | 11/1936 | Bowen | 261/118 |
| 2,635,952 | 4/1953 | D'Ouville | 422/232 X |
| 2,703,275 | 3/1955 | Elliott et al. | 422/232 X |
| 2,796,237 | 6/1957 | Nettel | 55/474 X |
| 3,136,705 | 6/1964 | Sommers | 34/57 X |
| 3,481,048 | 12/1969 | Hannum, Jr. | 34/59 |
| 3,526,483 | 9/1970 | Deussner et al. | 55/262 X |
| 3,716,969 | 2/1973 | Maeda | 55/390 |
| 3,851,042 | 11/1974 | Minnick | 423/244 |
| 3,885,918 | 5/1975 | Isahaya | 423/242 X |
| 3,906,078 | 9/1975 | Hausberg et al. | 423/242 |
| 3,917,800 | 11/1975 | McGauley et al. | 423/244 |
| 3,941,869 | 3/1976 | Fuchs | 423/239 |
| 3,966,418 | 6/1976 | Frevel et al. | 423/242 X |
| 3,969,482 | 7/1976 | Teller | 55/262 X |
| 3,983,218 | 9/1976 | Heins | 423/244 |
| 3,995,005 | 11/1976 | Teller | 55/262 X |
| 4,062,926 | 12/1977 | Knight | 423/244 |
| 4,083,701 | 4/1978 | Noack | 55/390 X |
| 4,130,944 | 12/1978 | Hultsch et al. | 34/8 |

FOREIGN PATENT DOCUMENTS

| 442514 | 4/1927 | Fed. Rep. of Germany | 55/474 |
|---|---|---|---|
| 2047534 | 4/1972 | Fed. Rep. of Germany | 55/262 |
| 266586 | 3/1927 | United Kingdom | 55/390 |
| 285038 | 5/1929 | United Kingdom | 55/262 |

*Primary Examiner*—Robert H. Spitzer
*Attorney, Agent, or Firm*—Wegner, Stellman, McCord, Wiles & Wood

[57] ABSTRACT

A method of desulfurizing boiler flue gas by intimate contact thereof with dry particles of a reactant or absorbent, such as hydrated lime, preferably with recirculation of the flue gas and entrained reactant or absorbent particles. An apparatus suitable for carrying out the method comprises an upstanding conduit defining a vertical gas flow path in communication with a source of SO$_2$—and particulate-laden flue gas, a conveyor for introducing a dry reactant or absorbent into the gas flow path, and a rotatable slinger mounted within the gas flow path for uniformly distributing the reactant or absorbent thereacross. In its preferred form, the apparatus includes recirculation means, preferably an eductor, mounted above the slinger for recirculation of gas and entrained reactant or absorbent within the gas flow path to enhance gas-solid contact time, a tangential gas inlet for creating vortical gas flow within the conduit, a gas expansion section at the conduit's discharge end and means for reversing the gas flow direction to enhance separation of particulates.

24 Claims, 7 Drawing Figures

FLUE GAS DESULFURIZATION APPARATUS AND METHOD

BACKGROUND OF THE INVENTION

1. Field of the Invention

This invention relates to a gas-solid contact method and apparatus and, more specifically, this invention relates to a method and apparatus for flue gas desulfurization and cleaning.

2. Description of the Prior Art

Concern surrounding the level of gaseous and particulate pollutants emitted from industrial and utility installations, such as in flue gas emitted from coal- and oil-fired industrial and utility boilers, has increased dramatically in recent years. Effective means for removing pollutants are required in order to make practical widespread use of relatively economical high sulfur- and ash-content coal, known to exist in great quantities in certain areas of the United States. Such coal is known to have relatively high heating values, expressed in BTU of available heat per pound.

The use of wet scrubbers for flue gas desulfurization and removal of particulates is well known. In general, prior scrubbers effected intimate contact of flue gas with aqueous or other solutions of lime, soda ash or other materials suitable for absorption of $SO_2$, $NO_x$ and particulate pollutants from the gas. Gas-liquid scrubbing contact was typically effected by means of sprays, packed beds, or other means well known in the art for effecting gas-liquid contact.

Wet scrubbers exhibit numerous disadvantages when used in flue gas desulfurization processes. Reactant or absorbent slurries used in such scrubbers typically contain no more than 25 weight percent solids, and thus require pumping systems of substantial capacity for supply, removal and recirculation of slurry. Further, many wet systems exhibit a substantial pressure drop, thus adding to the required pumping and blower capacity.

Even in scrubbing systems utilizing an alkali absorption medium, careful pH control is required to prevent corrosion resulting from excessive neutralization of reactant or absorbent and the consequent formation of acidic solutions. To prevent corrosion, wet scrubbing apparatus are often fabricated of relatively expensive stainless steel or other corrosion-resistant alloys.

Scaling, plugging and fouling is a common problem in alkali slurry and other wet flue gas scrubbers, as is mist carryover and the requirement of mist elimination equipment. Discharge of wet gas to the discharge stack, as a result of incomplete mist removal, causes additional corrosion problems. Careful control of the temperature of entering flue gas is required to avoid vaporization of scrubbing liquid and consequent steam production, which may result in undesirable pressure increases within process equipment. Contact of flue gas with scrubbing liquid results in waste of heat from the gas, which could otherwise be recovered. Resulting relatively low outlet temperatures from the scrubbing systems as well as mist carryover, cause stack and system corrosion.

Spent reactant or absorbent must be removed from slurry by filtration or other means. Drying of the resulting filter cake requires water removal equipment.

SUMMARY OF THE INVENTION

The present invention is directed to overcoming one or more of the problems as outlined above.

According to the present invention, a gas-solid contact method suitable for the removal of gaseous and particulate pollutants from boiler flue gas, or other polluted gas, is provided.

The method of the present invention is preferably carried out in an apparatus which defines an upstanding gas flow path within which is mounted a rotatable reactant or absorbent distributor, and means for introducing particles of a substantially dry solid reactant or absorbent to the gas flow path for contact by the distributor. The distributor is preferably a slinger which disperses reactant or absorbent particles in a pattern substantially perpendicular to the gas flow path.

Enhancement of gas-solid contact time is effected in the preferred form of the apparatus by a gas recirculator mounted in the gas flow path at or above the level of the slinger. The recirculator is typically an eductor having a discharge outlet directed upwardly and away from the slinger so as to impart a vertical rotational motion to flue gas and entrained reactant or absorbent. If desired, reactant or absorbent particles may be introduced to the eductor discharge outlet.

In a highly preferred form of the apparatus, polluted flue gas is introduced to the upper end of the gas flow path as a vortex, and means are provided at the lower end of the gas flow path to reverse the direction of gas flow to enhance separation of entrained solid material therefrom, thus minimizing or eliminating the need for post-absorption filtering means.

It has been found that the above described method and apparatus is operable on a substantially dry basis to remove up to 95% of gaseous pollutants from boiler glue gas produced by combustion of relatively high sulfur-content coal. The apparatus exhibits a very low pressure drop and need not be constructed of a corrosion-resistant material, since corrosive solutions are not produced. The particulate and $NO_x$ content of flue gas is typically reduced by more than 50% in the practice of the present invention.

DESCRIPTION OF THE PREFERRED EMBODIMENTS

Figure 1:
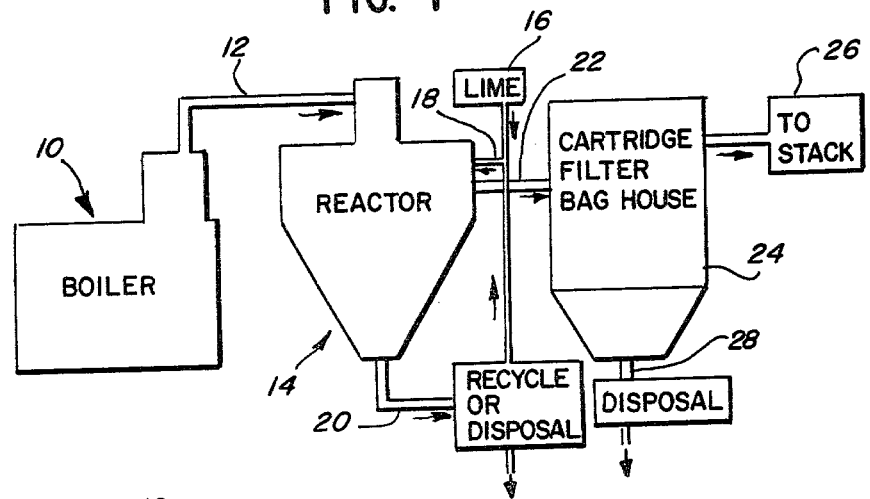
FIG. 1 is a schematic flow diagram illustrating a boiler flue gas desulfurization process incorporating the gas-solid contact apparatus of the invention.

Referring to FIG. 1, a boiler flue gas pollution control system incorporating a substantially dry gas-solid contact apparatus is illustrated. A boiler 10, which may be either coal- or oil-fired, emits a stream of flue gas through a conduit 12 communicating with a reactor 14, described in detail below. The flue gas typically contains undesirable levels of $SO_2$, $NO_x$ and particulate pollutants, depending upon the composition of the fuel being burned.

Although the apparatus 14 is referred to herein as a "reactor", it is to be understood that the apparatus is effective in carrying out, within the scope of the invention, a variety of gas-solid contact processes resulting in removal of selected gaseous constituents from a gas stream, whether by chemical reaction or by surface phenomena such as absorption or adsorption, and reference herein to "absorption" is intended to include all such processes.

In the case of coal containing more than about 3% sulfur, by weight, flue gas leaving the boiler 10 typically contains between about 1,200 and 2,500 ppm $SO_2$, about 0.01–0.08 grains/scf particulate matter and about 200–400 ppm $NO_x$. Typical values are 2,000 ppm $SO_2$, 0.05 grains/scf particulate matter and 300 ppm $NO_x$. Flue gas typically leaves the boiler 10 at about 550°–700° F.

Currently proposed Federal EPA regulations require that the $SO_2$ level of flue gas emitted from new coal-fired boilers be reduced by at least 85% before discharge of the gas to the atmosphere. Prior wet gas scrubbing systems are generally incapable of meeting such a stringent requirement. As described below, the flue gas cleaning system of FIG. 1, utilizing a gas-solid contact apparatus as shown in FIGS. 2–7 according to the method of the invention, has been found to meet or exceed all known proposed requirements.

Referring again to FIG. 1, flue gas flowing through the reactor 14 is contacted with lime, or an equivalent reactant or absorbent, typically an alkali, fed to the reactor 14 from a source 16 by feeding means 18. Partially spent reactant or absorbent is discharged from the reactor 14 through a line 20 from which it may be selectively recycled to the feeding means 18 or removed from the system as waste or for use as landfill, or for other uses. Cleaned gas is discharged from the reactor 14 through a line 22.

In some cases it may be desirable to filter gas discharged from the reactor 14, as by a cartridge filter bag house 24, for example. Clean gas is discharged from the bag house 24 or the reactor 14 through a stack 26. Particulate matter removed by the bag house 24 is discharged through a line 28 for disposal.

Figure 2:
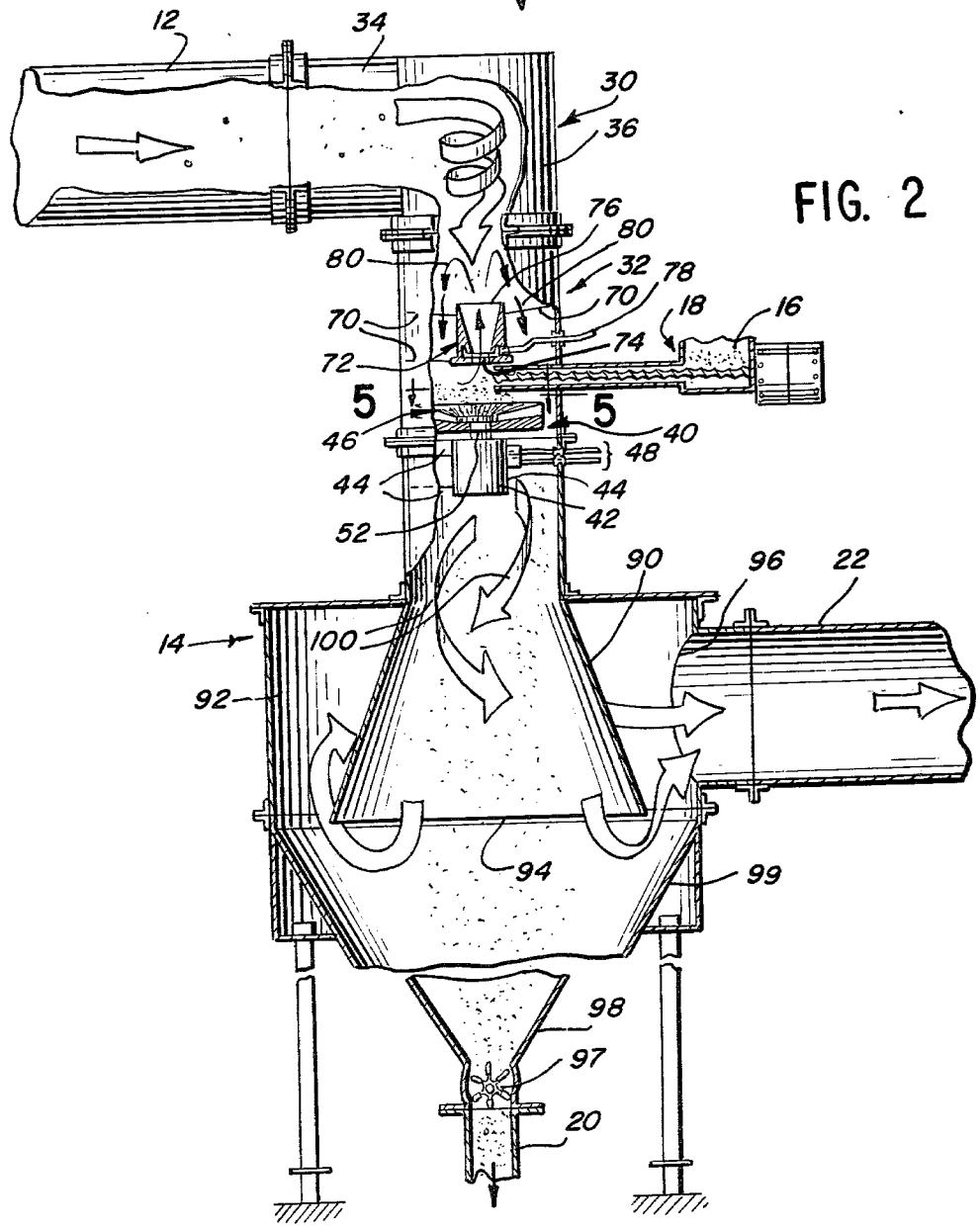
FIG. 2 is a fragmentary vertical section of one embodiment of the gas-solid contact apparatus of the invention.
Figure 3:
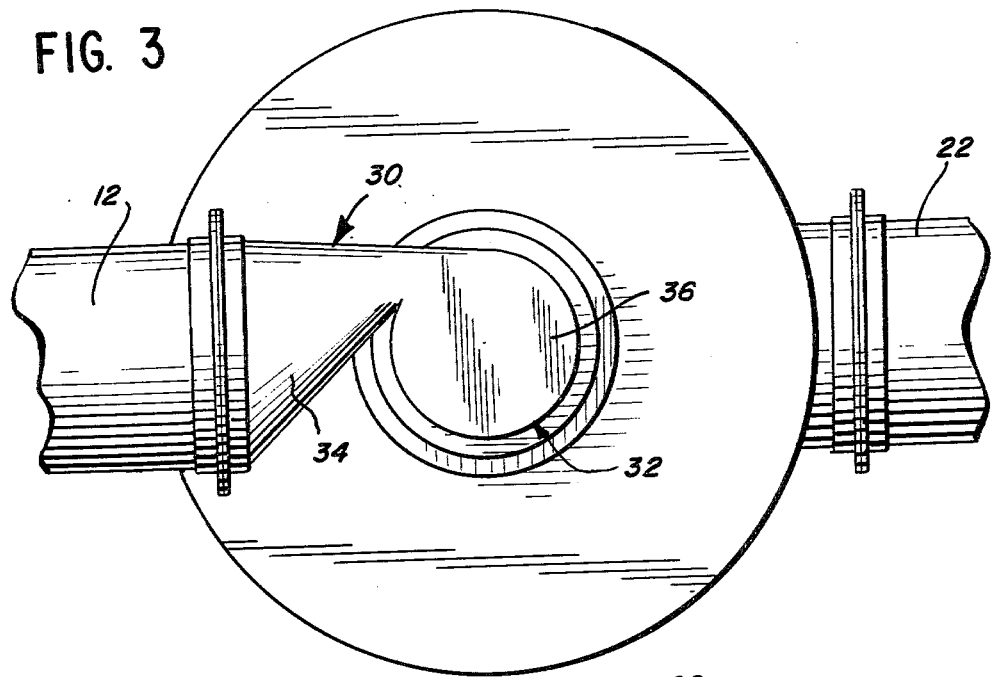
FIG. 3 is an overhead plan view of the apparatus of FIG. 2.

Referring now to FIG. 2, one embodiment of the reactor 14 of the invention will be described in detail. The flue gas conduit 12 leading from the boiler 10 communicates with an adapter 30 which directs the gas into a preferably cylindrical conduit, generally designated 32, defining a substantially vertical gas flow path. It is preferred, but not necessary, that the flue gas be introduced to the upper end of the conduit 32. Although the adapter 30 may comprise an L-shaped elbow, a preferred form of adapter 30 is shown in FIGS. 2-3. The adapter 30 of FIGS. 2 and 3 includes a frustrum-shaped conduit section 34 extending from the conduit 12 and terminating at a cylindrical, downwardly extending section 36 overlying the conduit 32. The conduit section 34 narrows from the conduit 12 to the conduit section 36 in order to increase the velocity of flue gas flowing therein, and communicates tangentially with the outer circumference of the section 36 in order to impart a vortical flow pattern to flue gas discharged from the section 34 to the conduit section 36.

Reactant or absorbent feeding means 18 is illustratively a conventional adjustable rate screw conveyor, such as the Accu-Rate (Series 500) manufactured by the Mechanical Development Corporation of Whitewater, Wis., for example. The feeding means 18 extends into the gas flow path 32 and is adapted to discharge particles of lime or other suitable reactant or absorbent, such as limestone, soda ash or nahcolite, for example, into the gas flow path. The reactant or absorbent may be substantially dry and is preferably in the form of relatively small particles to enhance the surface area available for contact with flue gas.

Mounted within the conduit 32 is a reactant or absorbent distribution means, generally designated 40. The distribution means 40 preferably comprises a rotary hydraulic motor 42, such as the Miller Fluid Power Company Model VS0 or the Volvo Model F-11C, suspended within the conduit 32 by a plurality of radial spokes 44 and rotatably supporting a slinger 46 thereabove. The hydraulic motor 42 has no exposed bearings to be contacted by corrosive flue gas constituents and absorbent. Hydraulic drive fluid is delivered and removed from the motor by lines 48 and functions as a coolant for the motor.

Figure 4:
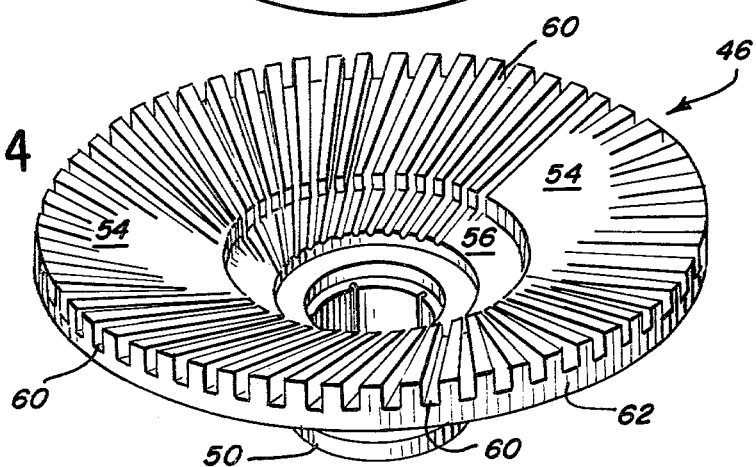
FIG. 4 is a perspective of one embodiment of the slinger of the apparatus of FIG. 2.
Figure 5:
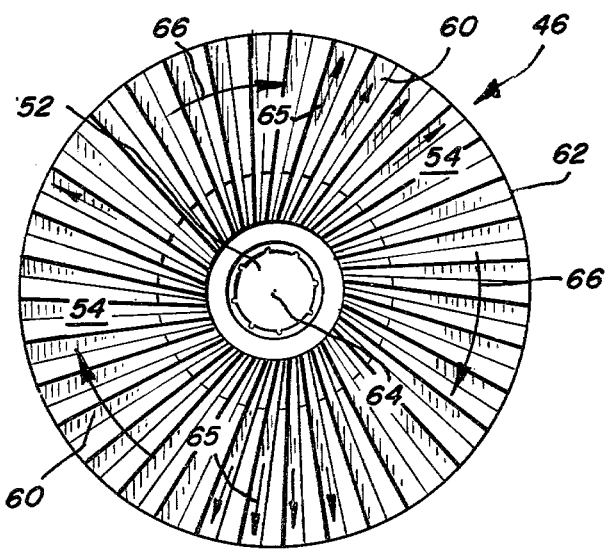
FIG. 5 is a top plan view taken approximately along line 5—5 of FIG. 2 showing the slinger of FIG. 4 in operation.

The slinger 46 functions to distribute reactant or absorbent particles substantially horizontally across the gas flow path 32 for intimate contact with flue gas. One preferred form of slinger 46 is illustrated in FIGS. 4–5. The slinger 46 includes a splined adapter 50 for receipt of and rotation with a shaft 52 driven by the motor 42. The slinger 46 preferably has a concave grooved upper surface 54 with a central recessed area 56. A plurality of grooves 60 formed in the surface 54 extend generally radially outwardly of the central area 56 to the slinger's outer periphery 62. The grooves 60 are preferably offset slightly of the slinger's center 64 so as to intersect radials at a slight angle.

The speed of the motor 42, and thus the slinger 46, is continuously variable between about 0–2500 rpm. Solid reactant or absorbent material 16 received on the upper slinger surface 54, as in FIG. 5, is centrifugally propelled outwardly, in the direction of the arrow 65, through the grooves 60. When the slinger 46 is rotated in the direction of the slope of the grooves 60 outward from the central slinger area 56, as shown by the arrows 66, solid material 16 is propelled predominantly through the grooves 60 and outwardly of the slinger's periphery 62 substantially perpendicularly thereto.

The peripheral speed of the slinger 46, and hence the speed at which particulate reactant or absorbent is propelled therefrom, depends upon the slinger's diameter and speed of rotation. In pilot studies, it has been found that a 6-inch diameter slinger rotated at 2200 rpm produces particles of reactant or absorbent of uniformly small size, and that the grooves 60, formed to a depth of 0.5", are self-cleaning.

Contact of polluted flue gas with lime or other reactant or absorbent distributed across the gas flow path 32 by the slinger 46 effects reaction or absorption of a substantial amount of the $SO_2$, $NO_x$ and particulates contained in the flue gas, if a sufficient stoichiometric ratio (as set forth in the example below) of reactant or absorbent to pollutants is provided through the feeding means 18.

Therefore, the invention resides in its simplest form in distribution of particles of a suitable reactant or absorbent across a flue gas flow path by distribution means, such as means 40 in FIG. 2. However, the preferred embodiments of FIGS. 2 and 6-7 incorporate further means to enhance $SO_2$, $NO_x$ and particulate removal efficiency.

Mounted within the conduit 32, as by a plurality of radial spokes 70, is a recirculation means, generally designated 72, to effect rotary recirculation of flue gas and entrained solid reactant or absorbent and pollutants by counterflow within the conduit 32 in order to increase gas-solid contact time.

The recirculation means 72 preferably comprises a forced-air eductor having intake and discharge openings 74 and 76, respectively, and supplied with compressed air by a line 78. Means such as the recirculator 72 are conventionally available and operate under the Coanda effect, the venturi effect or the ejector principle and may exhibit amplification ratios (based on the driving medium) of more than 10:1. Examples of such recirculation means are the Transvector ™ Air Flow Amplifier Model Nos. 912-915 and 952-955 manufactured by Vortec Corporation of Cincinnati, Ohio, and the AM series of air movers manufactured by HMC-Brauer Limited of England. If desired, a fan may be utilized as a recirculator, but is less efficient and requires moving parts.

Compressed air supplied through line 78 induces movement of air, flue gas and particulate matter within the gas flow path 32 into the intake opening 74, through the recirculator 72 and out of the discharge opening 76, which is preferably directed upwardly away from the slinger 46 against the downward flow of flue gas. As indicated by the arrows 80, a generally vertical, rotary recirculation pattern is thus established in order to enhance gas-solid contact time. It is believed that recirculation of gas and entrained solids is enhanced by relatively high gas entry velocities at the adapter 30.

In the exemplary embodiments of FIGS. 2 and 6, the absorbent feeding means 18 is shown as discharging directly above the slinger 46 and below the recirculation means 72. Effective results are also obtained by feeding of reactant or absorbent to the recirculator discharge outlet 76 for discharge therefrom and eventual contact with the rotating slinger 46 and distribution across the gas flow path 32.

Referring to FIG. 2, the gas flow path 32 terminates at its lower end in a frusto-conical expansion zone 90 contained within a chamber 92. The flue gas conduit 22 communicates with the chamber 92 and extends therefrom, as seen in FIG. 1. The expansion zone 90 terminates at a lower edge 94 at a point substantially below the entrance 96 to the flue gas conduit 22.

The flow of gas and entrained solids through the expansion zone 90 results in substantial deceleration of the gas due to an increase in cross-sectional area. However, it has been found that the velocity of entrained solids is only negligibly affected. Such a change in relative velocities, and simultaneous increase in shear, between gas and solids is believed to enhance $SO_2$ and $NO_x$ absorption and separation of pollutants and reactant or absorbent from the flue gas. Solid material separated from the gas falls from the expansion zone 90 to an air lock feeder 97 disposed at the apex 98 of a conical-shaped hopper 99. The air lock 97 is gas-tight to prevent escape of flue gas therefrom, and is of the type manufactured by William W. Meyer & Sons, Inc. of Skokie, Ill., under the name Roto-Flow. Solid material is removed from the air lock 97 through the conduit 20 for disposal or recycle.

The gas flow pattern in the portion of the conduit 32 below the level of the slinger 46 and in the expansion zone 90 remains vortical as shown by the arrows 100. It is believed that the vortical flow pattern imparted by the gas entrance adapter 30 enhances gas-solid contact time and hence, reaction or absorption of pollutants.

The lower edge 94 of the expansion zone 90 is located substantially below the discharge conduit entrance 96 to require flue gas flowing from the expansion zone 90 to reverse its direction of flow before discharge in order to centrifugally force particulate matter downwardly into the hopper 99, thereby enhancing gas-solid separation.

Figure 7:
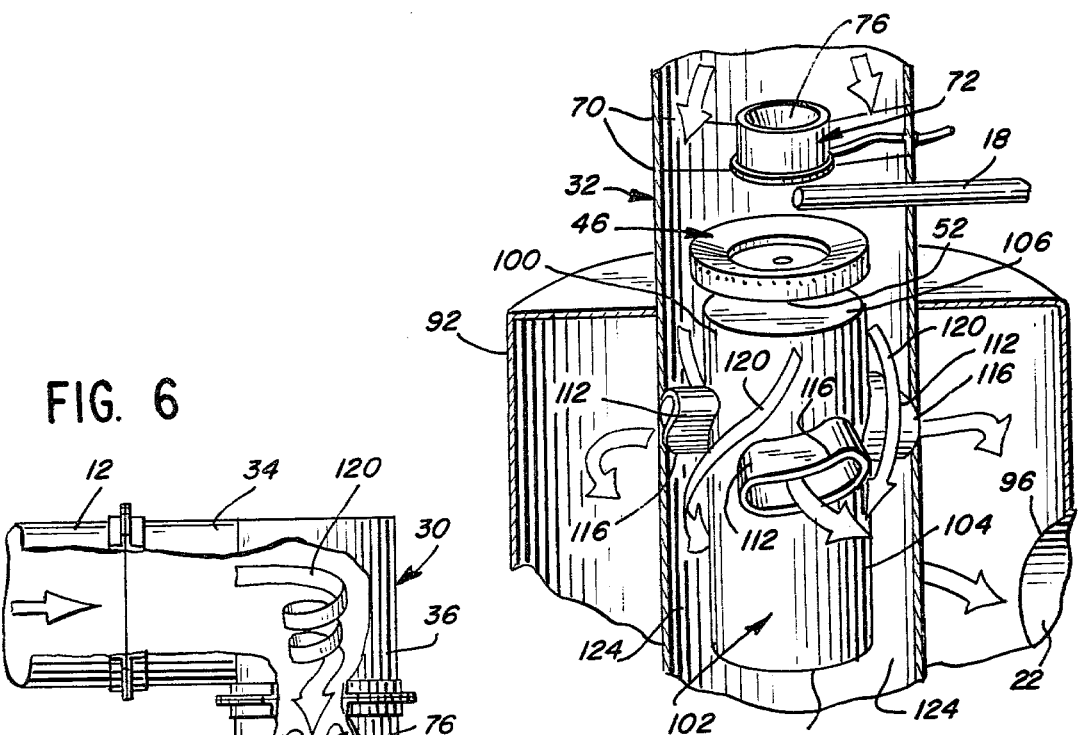
FIG. 7 is an enlarged fragmentary perspective of a portion of the gas-solid contact apparatus of FIG. 6.
Figure 6:
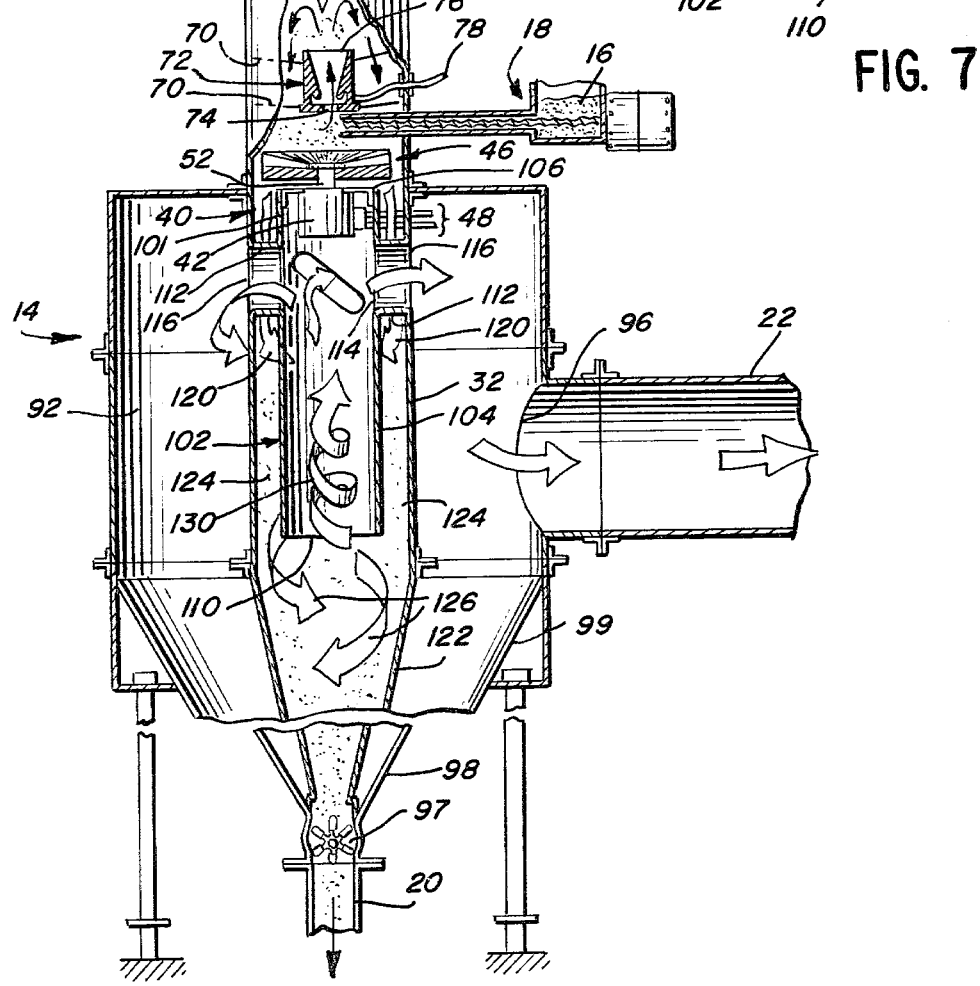
FIG. 6 is a fragmentary vertical section of an alternative embodiment of the gas-solid contact apparatus of the invention.

With reference now to FIGS. 6-7, an alternative embodiment of the reactor 14 is illustrated. (Those elements of the reactor 14 of FIGS. 6 and 7 which are identical to elements shown in FIGS. 2-5 are identified by identical reference numerals.) The apparatus 14 of FIGS. 6-7 does not incorporate an expansion zone, but facilitates gas-solid separation by reversal of gas flow direction within the gas flow path 32 before discharge to the chamber 92 and the conduit 22.

The motor 42 and slinger 46 rotatably carried thereby are mounted at the upper end 101 of a vertically extending conduit 102 mounted within the conduit 32 substantially coaxially therewith. The conduit 102 comprises a vertically extending cylindrical wall 104 closed at its upper end 101 by a circular cover plate 106 through which the slinger drive shaft 52 extends. The cylinder 104 is open at its lower end 110.

Extending radially outwardly of the cylinder 104 and terminating at the wall 32 are a plurality of circumferentially spaced, hollow arms 112. The interior of the cylinder 104 communicates with the chamber 92 through respective pluralities of aligned pairs of ports 114 and 116 in the cylinder 104 and conduit 32, respectively, each pair of ports 114 and 116 being aligned and communicating with the arms 112.

As best seen in FIG. 7, the ports 114 and 116 and hollow arms 112 are of generally elliptical cross section and are inclined relative to the horizontal in the direction of the cyclonic gas flow, indicated by the arrows 120. The spacing and inclination of the hollow arms 112 maintain the vortical nature of the gas flow path in the conduit 32.

As best seen in FIG. 6, the conduit 32 terminates at its lower end in an integral, generally conical solids-receiving hopper 122 terminating at an air lock 98.

Gas enters the apparatus of FIGS. 6-7 and is initially contacted with particles of reactant or absorbent and recirculated therewith in a manner identical to that in the reactor 14 of FIG. 2. After initial contact, flue gas and entrained reactant or absorbent flows downwardly past the arms 112, maintaining a generally cyclonic flow path in the annular region 124 defined by the cylindrical walls 104 and 32, as shown by arrows 120. Such vortical gas and solids circulation extends to a level within the hopper 122 below the lower end 110 of the cylinder 104 as shown by arrows 126. Since the lower end of the hopper 122 is closed, the direction of flow of the flue gas is reversed, thereby enhancing gas-solid separation and deposition of solids at the air lock 98.

It is believed that the upwardly flowing flue gas retains a generally cyclonic path, as shown by arrows 130, in a direction opposite to that of the vortical downwardly directed gas flow path (arrows 126) and that contact between the oppositely directed gas flow paths enhances separation of particulate material from flue gas, as well as SO₂ and NOₓ reaction or absorption. Upwardly flowing flue gas exits the cylinder 104 through the hollow arms 112 and flows from the chamber 92 and to the gas discharge conduit 22. It is believed that acceleration of downwardly flowing gas in the hopper 122 results in enhancement of centrifugal solids separation.

In order to minimize pressure drop across the apparatus 14, the sum of the cross-sectional areas of the arms 112 is preferably equal to the cross-sectional area of the cylinder 104.

It will be appreciated that the substantially 90° change in direction of flue gas flow from within the conduit 102 through the arms 112, and flow of gas against the cover plate 106 contributes to particulate removal efficiency.

A specific example will illustrate the operation of the method and apparatus of the invention in desulfurization of boiler flue gas.

EXAMPLE

A series of SO₂, NOₓ and particulate removal tests were conducted utilizing a pollution control system as shown in FIG. 1. The reactor 14 was of the type shown in FIGS. 2-5.

The boiler 10 was a coal-fired Kewanee R Type 1.6 million BTU/hr. hot water boiler, burning coil having sulfur and ash contents of about 3.3 wt.% and 13 wt.%, respectively, on a dry basis. The coal was rated at 12,500 BTU/lb.

The lines 12 and 22 and the conduit 32 were of circular cross-section and 18" in diameter. A cyclonic entry adapter 30 having a throat width of 2" introduced polluted flue gas to the upper end of the conduit 32.

A slinger 46 as shown in FIG. 4 and having a diameter of 14" and grooves 60 of a depth of 0.5" was driven by a Volvo Model F-11C rotary hydraulic motor. The slinger 46 was driven at 2200 rpm in all tests but for test #9, conducted at 2500 rpm.

A Transvector TM Model No. 914 eductor was positioned above the slinger 46 with its discharge outlet directed away from the slinger. Compressed air was fed to the eductor at about 10 scfm.

Particles of hydrated lime (Ca(OH)₂), ranging from mesh size 325 to mesh size 125 were fed to the slinger 46 at a controlled rate by an Accu-Rate (Series 500) screw conveyor.

The diameter of the expansion zone 90 at its lower edge 94 was about 25", thus providing an exit cross-sectional area approximately twice that of the conduit 32 in order to decrease gas flow velocity in the expansion zone 90 to about 50% of that in the conduit 32.

A Torit cartridge-type bag house using Nomex filter cartridges and a square bladed indirect draft discharge fan driven by a 3 hp motor was used in series with the absorber 14 to provide post-reaction or absorption filtration.

Flue gas leaving the boiler was found to vary in SO₂ content from between about 1600 ppm–2300 ppm, by weight, depending in part upon the amount of excess air introduced to the boiler. (Most tests were conducted between about 50% and 65% excess air to simulate industrial boiler operation.) NOₓ levels varied between about 200 ppm–400 ppm (by weight), and about 0.01–0.08 grains fly ash/scf were discharged from the boiler.

Flue gas discharge temperature varied between about 550°–700° F., and flue gas entered the reactor at temperatures varying between 450°–600° F.

The flue gas emission rate was about 860 scfm, and entry velocity through the adapter throat was about 32 fps, slowing to about 8 fps in the conduit 32 and line 22, and about 4 fps in the expansion zone 90. The pressure drop across the reactor 14 was less than 0.5" H₂O on all tests.

Hydrated lime at ambient temperatures was fed to the rotating slinger at rates varying between about 0.8–3.0 lb. lime/lb. SO₂. The reactions effected between the lime and SO₂ in the flue gas are believed to be as follows:

$$Ca(OH)_2 + SO_2 \rightarrow CaSO_3 + H_2O \uparrow \quad (1)$$

$$Ca(OH)_2 + SO_2 + \tfrac{1}{2}O_2 \rightarrow CaSO_4 + H_2O \uparrow \quad (2)$$

The amount of excess air (as provided in the boiler and by the eductor feed lines) determines the degree to which reaction (2) occurs. It has been found that gypsum (CaSO₄.2H₂O) is formed in the presence of substantial excess air and humidity in the flue gas.

In all tests, gas discharge temperatures from the reactor 14 were between about 320°–370° F. The amount of excess air added to the boiler 10 was controlled so as to maintain the reactor gas discharge temperature below about 370° F. in order to prevent damage to the Nomex filter cartridges in the bag house.

SO₂ levels in gas discharged from the reactor varied between about 200 ppm–1200 ppm, with about 0.01–0.04 grains/scf particulate matter. Gas temperatures at the bag house discharge were between about 300°–350° F., with particulate levels less than 0.01 grain/scf and NOₓ levels approximately between 100–200 ppm. SO₂ levels at the bag house gas discharge are summarized in Table I:

TABLE I

| Test # | ABSORBENT MATERIAL | Reactant or Absorbent/SO₂ (lb.lime/lb.SO₂) Ratio | SO₂*(In) | SO₂ (Out) | % Efficiency |
|---|---|---|---|---|---|
| 1 | Hydrated Lime (Ca(OH)₂) | 3:1 | 1600 ppm(wt) | 400 ppm(wt) | 75 |
| 2 | Hydrated Lime (a) | 3:1 | 2000 | 180 | 91 |
| 3 | Hydrated Lime | 2.5:1 | 2000 | 400 | 80 |
| 4 | Hydrated Lime | 0.8:1 | 2000 | 1100 | 45 |
| 5 | Hydrated Lime | 2:1 | 1800 | 400 | 78 |
| 6 | Hydrated Lime | 1.5:1 | 2300 | 750 | 67 |
| 7 | Hydrated Lime (b) | 1:1 | 2000 | 700 | 65 |
| 8 | Hydrated Lime (c) | 1.5:1 | 1700 | 200 | 88 |

TABLE I-continued

| Test # | ABSORBENT MATERIAL | Reactant or Absorbent/SO$_2$ (lb.lime/lb.SO$_2$) Ratio | SO$_2$*(In) | SO$_2$ (Out) | % Efficiency |
|---|---|---|---|---|---|
| 9 | Hydrated Lime (d) | 1.5:1 | 2000 | 100 | 95 |

(a) Half added at point approximately 5 feet upstream of reactor.
(b) Half added at point approximately 5 feet upstream of reactor. Inspection revealed accumulative pile in duct at end of test.
(c) After 10 minutes flow, efficiency rose to 94%.
(d) Varied RPM from other tests.
*SO$_2$ analysis conducted with Bendix Model 5M SO$_2$ indicator apparatus.

In all tests, visual observation of stack effluent indicated no plume or other evidence of particulate pollution.

It has been found that reactant or absorbent may be conserved by recycle of partially spent reactant or absorbent from the reactor to the reactant/absorbent delivery screw conveyor. A recycle ratio of about 2:1 (partially spent:fresh) has been found to provide effective reaction or absorption.

Throughout the foregoing, it has been emphasized that the reactor apparatus and reaction or absorption method of the invention are effective using a substantially dry reactant or absorbent, as opposed to a solution or slurry of absorbent. It will of course be understood by those skilled in the art that the terms "substantially dry" and "substantially liquid-free" are not intended to denote bone-dry reactant or absorbent particles but rather material in which a suspending medium or solvent is not present. It is to be understood that reactant or absorbent materials useful in the practice of the invention are naturally hygroscopic and may react with or absorb a nominal amount of moisture from the air, yet remain in the form of discrete particles, the preferred form of material contemplated for use with the invention.

It will, however, be apparent that the apparatus of the invention may be utilized to effect wet scrubbing of gas, or other forms of gas-liquid or gas-liquid-solid contact by the introduction of a suitable aqueous or other scrubbing liquid to the rotating slinger.

Similarly, it will be recognized that flue gas desulfurization is merely one form of gas-solid contact which may be effected by the method and apparatus of the invention. It is contemplated that other specific forms of mass transfer operations and chemical reactions may be advantageously conducted according to the present invention, and no unnecessary limitations are to be implied from the detailed discussion of flue gas desulfurization herein.

One advantage resulting from the absence of liquid in the reactor of the present application is the maintenance of relatively high gas temperatures which is believed to contribute to reaction or absorption efficiency and makes heat available for reclamation downstream of the reactor and/or bag house and upstream of the discharge stack by well known heat exchange techniques. Such reclamation is limited or impractical with wet scrubbing systems wherein excess heat is lost to scrubbing liquid.

It is believed that a slinger of the type shown in FIGS. 4 and 5, when rotated at speeds above about 2000 rpm, effects size reduction of particulate reactant or absorbent deposited thereon, and that the degree of size reduction is a direct function of the speed of rotation. Therefore, it is believed that increasing the slinger's speed of rotation enhances reaction or absorption efficiency due to reactant or absorbent size reduction and a consequent increase in available surface area per unit weight of reactant or absorbent.

It will be appreciated by those skilled in the art that the gas-solid contact method and apparatus described above presents many advantages relative to prior wet scrubbing systems and methods, including lower operation energy costs due to the absence of pumps and the low pressure drop across the system. It is believed that energy costs may be typically reduced by between 50% and 90% by utilization of the present invention in flue gas desulfurization systems.

Due to the absence of corrosive liquids in the system, initial capital cost is decreased since corrosion-resistant alloys and pH control systems are not required, and operating costs are reduced, due to the system's relative simplicity of operation, the minimal number of moving parts, and the reduction or elimination of plugging, scaling and fouling.

The absence of liquid in the system also eliminates the need for mist separation and filter cake water removal equipment.

The foregoing detailed description is given for clearness of understanding only and no unnecessary limitations should be understood therefrom, as modifications will be obvious to those skilled in the art.

We claim:

1. An apparatus for removing gaseous and particulate pollutants from a polluted gas, comprising:

a chamber;

means communicating with said chamber for receiving gas cleaned by said apparatus;

a conduit having an inlet and a discharge and defining a substantially vertical gas flow path, said inlet communicating with a source of said polluted gas and said discharge communicating with said chamber and said clean gas receiving means;

means for introducing substantially dry, particulate sorbent or reactant to said gas flow path;

means mounted in said gas flow path for receiving and distributing at least a portion of said dry sorbent or reactant particles across said gas flow path to entrain said sorbent or reactant particles in said gas;

means for separating said sorbent or reactant particles and said polluted particles from said gas and directing said gas to said clean gas receiving means; and, means mounted within said gas flow path for recirculating by counterflow at least a portion of said gas, said sorbent or reactant particles and said pollutant particles therein prior to separation of said sorbent or reactant particles and said pollutant particles from said gas.

2. The apparatus of claim 1 wherein said sorbent or reactant receiving and distributing means comprises a rotatable slinger mounted in said gas flow path at a point below said sorbent or reactant introduction means and having a solids-receiving surface extending across said gas flow path for receipt of said sorbent or reactant.

3. The apparatus of claim 2 wherein said solids-receiving surface comprises a series of generally radially extending grooves for distribution and size reduction of particles received thereon.

4. The apparatus for claim 2 wherein said solids-receiving surface is disposed directly below said sorbent or reactant introducing means.

5. The apparatus of claim 4 wherein said recirculating means is disposed above said sorbent or reactant receiving and distributing means.

6. The apparatus of claim 5 wherein said recirculating means comprises an air eductor having an intake end and a discharge end with said eductor discharge end directed upwardly away from said sorbent or reactant receiving and distributing means and said intake end adjacent said sorbent or reactant receiving and distributing means for eduction of gas and entrained particles thereinto and discharge of said gas and entrained particles upwardly away from said sorbent or reactant receiving and distributing means.

7. The apparatus of claim 6 wherein said sorbent or reactant introducing means is disposed substantially directly above said eductor discharge.

8. The apparatus of claim 7 wherein said conduit inlet communicating with said source of polluted gas has a discharge of reduced cross-section directed substantially tangentially to the inner circumference of said conduit gas flow path to establish a vortical gas-flow pattern therein.

9. An apparatus for removing gaseous and particulate pollutants from a polluted gas, comprising:
a chamber;
means communicating with said chamber for receiving gas cleaned by said apparatus;
a conduit having an inlet and a discharge and defining a substantially vertical gas flow path, said inlet communicating with a source of said polluted gas and said discharge communicating with said chamber and said clean gas receiving means;
means for introducing substantially dry, particulate sorbent or reactant to said gas flow path;
means mounted in said gas flow path for receiving and distributing at least a portion of said dry sorbent or reactant particles across said gas flow path to entrain said sorbent or reactant particles in said gas; and,
means for separating said sorbent or reactant particles and said pollutant particles from said gas and directing said gas to said clean gas receiving means, said gas and particle separation means comprising a terminal conduit portion of enlarged cross-section at said conduit discharge disposed at a point below said clean gas receiving means, and solids-receiving means in said chamber disposed below said enlarged cross-section conduit portion for receipt of solids discharged therefrom.

10. The apparatus of claim 9 wherein said terminal conduit portion comprises a frustoconical expansion zone directed downwardly and outwardly from said first conduit discharge.

11. The apparatus of claim 9 wherein said sorbent or reactant receiving means is disposed directly below said sorbent introducing means.

12. The apparatus of claim 9 wherein said sorbent or reactant receiving and distributing means comprises a rotatable slinger mounted in said gas flow path at a point below said sorbent or reactant introducing means and having a solids-receiving surface extending across said gas flow path for receipt of said sorbent or reactant.

13. The apparatus of claim 12 wherein said solids-receiving surface comprises a series of generally radially extending grooves for distribution and size reduction of particles received thereon.

14. The apparatus of claim 9 wherein said first conduit inlet communicating with said source of polluted gas has a discharge of reduced cross-section directed substantially tangentially to the inner circumference of said first conduit gas flow path to establish a vortical gas flow pattern therein.

15. An apparatus for removing gaseous and particulate pollutants from a polluted gas, comprising:
a chamber;
means communicating with said chamber for receiving gas cleaned by said apparatus;
a first conduit having an inlet and a discharge and defining a substantially vertical gas flow path, said inlet communicating with a source of said polluted gas and said discharge communicating with said chamber and said clean gas receivingg means, said first conduit discharge comprising a plurality of ports disposed circumferentially about said first conduit;
means for introducing substantially dry, particulate sorbent or reactant to said gas flow path;
means mounted in said gas flow path for receiving and distributing at least a portion of said dry sorbent or reactant particles across said gas flow path to entrain said sorbent or reactant particles in said gas;
means for separating said sorbent or reactant particles and pollutant particles from said gas and directing said gas to said clean gas receiving means, said gas and particulate separation means comprising a second conduit having a closed upper end and an open lower end mounted within said first conduit substantially coaxially therewith to define an annular flow passage between said first and second conduits, said second conduit having a plurality of gas discharge ports disposed circumferentially thereabout between said upper and lower ends, each of said second conduit discharge ports being associated with a discharge port of said first conduit, and a plurality of third conduits extending radially across said annular passage and connecting said associated pairs of discharge ports.

16. The apparatus of claim 15 wherein said first conduit inlet communicating with said source of polluted gas has a discharge of reduced cross-section directed substantially tangentially to the inner circumference of said first conduit gas flow path to establish a vortical gas flow pattern therein.

17. A flue gas desulfurization apparatus operable on a dry basis to remove $SO_2$ and particulate material from polluted flue gas, comprising:
an upstanding conduit defining a substantially vertical gas flow path and having an upper and a lower end, said upper end communicating with a source of polluted flue gas and said conduit terminating at its lower end in a gas receiving chamber communicating with and surrounding said lower end and further communicating with a clean gas discharge port, said lower end terminating at a point substantially below said clean gas discharge port and said chamber further including means underlying said lower end for receipt of solid material discharged therefrom;

means for feeding substantially dry, discrete particles of sorbent or reactant into said gas flow path;

a rotatable slinger mounted in said gas flow path for receipt and centrifugal distribution of said sorbent or reactant particles across said gas flow path at a point above said lower end; and a recirculator mounted in said gas flow path and overlying said slinger, said recirculator having an inlet and an outlet for intake and discharge, respectively, of flue gas and solid sorbent or reactant particles and said pollutant particles entrained in said flue gas for recirculation thereof by counterflow in said gas flow path, said recirculator inlet being adjacent said slinger and said recirculator outlet being directed upwardly away from said slinger.

18. The apparatus of claim 17 wherein said conduit terminates at its lower end and said lower end comprises an expansion section of enlarged cross-section.

19. The apparatus of claim 18 wherein said expansion section is generally frustoconical in shape and extends downwardly and outwardly from said conduit.

20. The apparatus of claim 17 further including an inlet of reduced cross-section disposed between said conduit upper end and said flue gas source and having a discharge directed substantially tangentially to the inner circumference of said conduit whereby a vortical gas flow pattern is established in said gas flow path.

21. The apparatus of claim 15 wherein said recirculator comprises an air eductor having an inlet and an outlet.

22. A method of removing gaseous and particulate pollutants from flue gas by sorption or reaction of said pollutants on or with discrete particles of substantially liquid-free sorbent or reactant, said method comprising the consecutive steps of:

(a) defining a substantially vertical gas flow path from a source of said flue gas to a clean gas discharge means;

(b) causing polluted flue gas to flow downwardly through said flow path;

(c) uniformly distributing said discrete sorbent or reactant particles across said gas flow path to effect intimate contact between said flue gas and said sorbent or reactant particles and to entrain at least a portion of said sorbent or reactant particles in said gas;

(d) recirculating at least a portion of said polluted flue gas and entrained sorbent or reactant particles and said pollutant particles within said gas flow path by counterflow to enhance the time of contact between said polluted flue gas and said sorbent or reactant particles;

(e) changing the direction of flow of said flue gas and entrained sorbent or reactant particles and said pollutant particles to separate said entrained particles from said gas; and (f) directing said gas into said clean gas discharge means.

23. The method of claim 22 wherein said flue gas is separated from sorbent or reactant and said pollutant particles by directing the flow of said gas upwardly before said gas is directed to said clean gas discharge conduit.

24. The method of claim 23 further including the step of expanding said flue gas before reversing its direction to enhance separation of said gas from said particles.

* * * * *